June 24, 1952   A. REDLER   2,601,558
CONVEYER FOR GRAIN AND LIKE MATERIALS
Filed April 11, 1950   2 SHEETS—SHEET 1
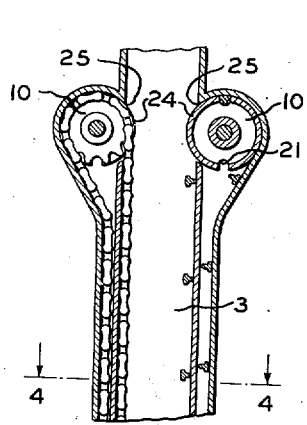
FIG. 1
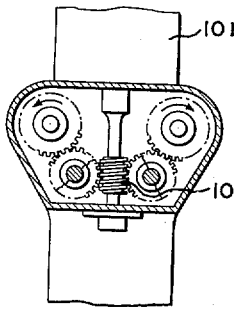
FIG. 2
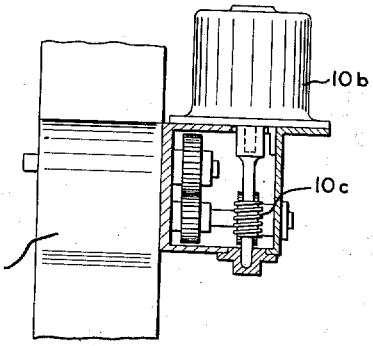
FIG. 3
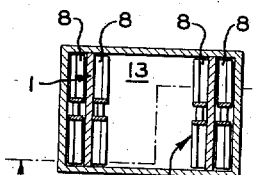
FIG. 4
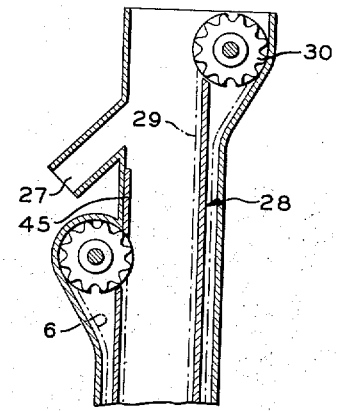
FIG. 6
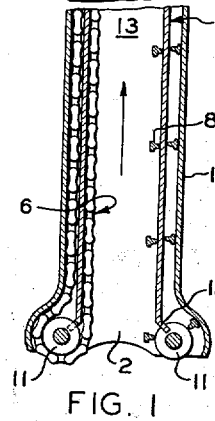
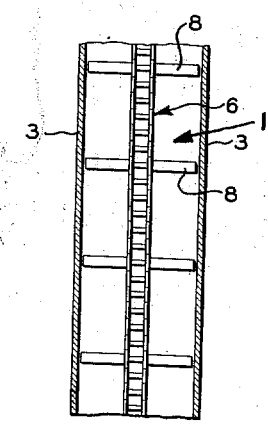
FIG. 5
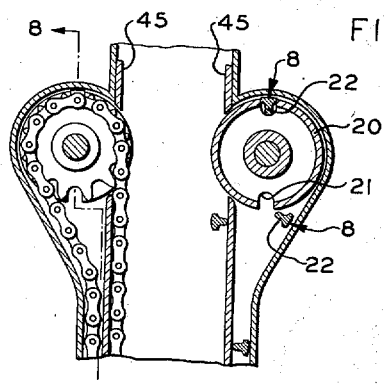
FIG. 7
INVENTOR
Arnold Redler
BY Donald L. Brown
ATTORNEY

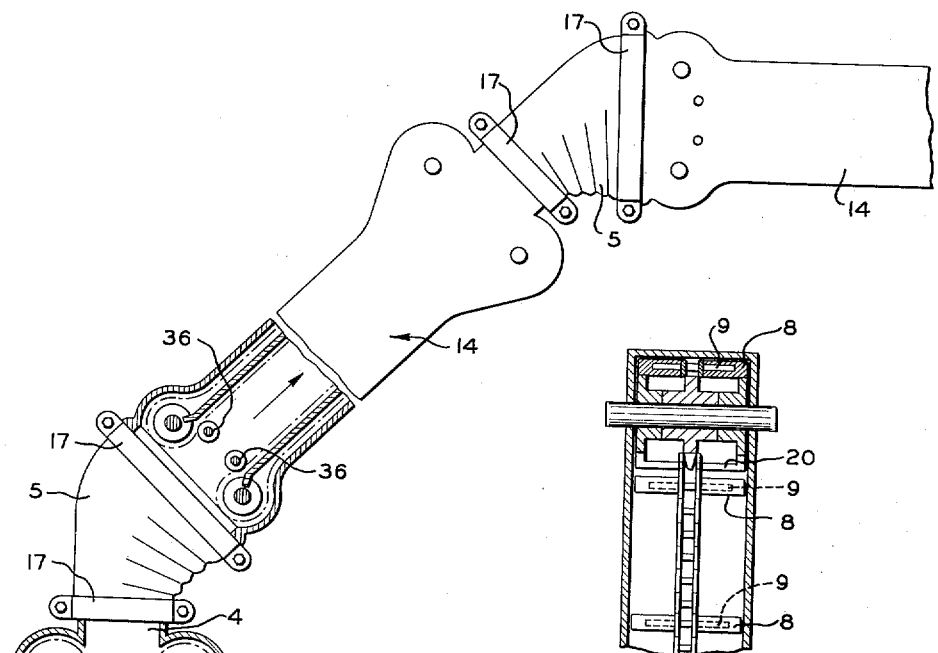
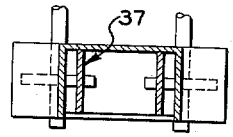
FIG. 11
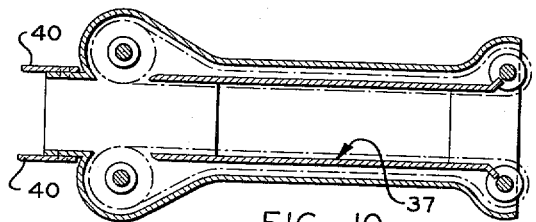
FIG. 10
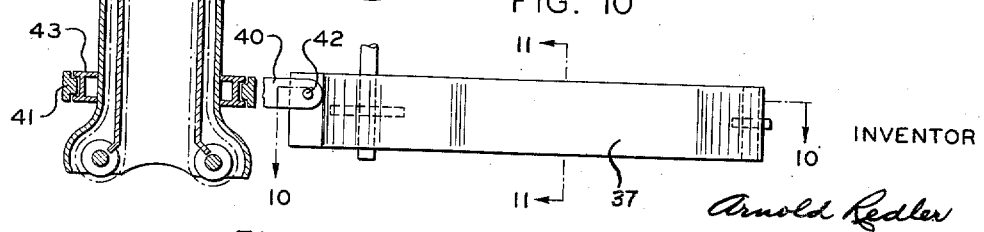
FIG. 9

Patented June 24, 1952

2,601,558

UNITED STATES PATENT OFFICE 2,601,558

CONVEYER FOR GRAIN AND LIKE MATERIALS

Arnold Redler, Stroud, England, assignor to Arnold Redler Limited, Stroud, county of Gloucester, England, a British company Application April 11, 1950, Serial No. 155,147
In Great Britain February 15, 1949

13 Claims. (Cl. 198—164)

This invention relates to en masse conveyors, which term includes elevators.

It is the object of the invention to provide improvements in this form of conveyor which greatly increase its usefulness and adaptability and which enable conveying systems to be produced which are small and light but are capable of handling, for example, pulverized material, flowable solid material, grain or like material.

More particularly, the invention provides a conveyor which is economical as regards the space required for its installation; the improved conveyor is also especially advantageous for "flexible" or adaptable conveyor installations such as are required for unloading grain or equivalent from ships and barges. In certain embodiments of the invention, very slow speed may be used for reduced capacity, or for special material, and for heavy machines.

In accordance with one aspect of the present invention I provide an en masse conveyor comprising, in combination, a trunk-like conduit having a portion adapted to receive material to be transported and a discharge portion, a plurality of spaced, endless, chain-like members, each provided with a multiplicity of spaced, laterally extending flights adapted to engage and transport material within said conduit and between the said portions of said conduit, said chain-like members being positioned to travel in close proximity to, or substantially to sweep the internal sides of, the conduit, and driving means for advancing said chain-like members within said conduit under tension, each of said chain-like members being positioned with its material-engaging portion within said conduit and the remainder thereof exteriorly of said conduit, the discharge portion of said conduit being positioned, in the direction of material flow, beyond the point at which at least one of the chain-like members leaves the interior of the conduit.

Delivery of the transported material from within the conduit may be by chute or the conduit, if desired, may incorporate at its delivery end a tubular coupling into which the transported material wells up under pressure, said coupling being arranged for connection to the lower end of a succeeding conveyor conduit. The coupling between said conduits may be of a flexible nature to permit relative angular movement of the two conduits, such as a ball and socket joint. Thus, the interior of the ball portion of the coupling may constitute a cup-like receptacle into which the grain or equivalent is delivered under pressure and is taken up by the tension members of the succeeding conveyor.

At least one of the tension members may leave the interior of the conduit at its exit portion by means of a trap for the grain or equivalent, said trap comprising a roller or flap which may be of resilient material disposed within an aperture in the conduit wall, that part of the aperture periphery which lies adjacent the outwardly moving roller surface being shaped to lie close to the said roller surface, for preventing the escape of the grain or equivalent which is under pressure. Where the tension member comprises one or more chains, ropes or the like having lateral flights at intervals, the curved surface of the roller may advantageously be grooved to receive the chain or equivalent and also the flights, these lying flush with the general curved surface of the roller so as to pass out through the aperture without substantial grain leakage. Preferably the flights are fitted to the tension members at intervals which may substantially correspond with the circumference or semi-circumference of the roller. The surface of the roller is grooved to receive the flights and these grooves may assist a sprocket or other chain-engaging member associated with the roller to provide a positive drive for the chain-like member.

In one embodiment of the invention, at the feed end of the trunk the chains or conveying members protrude beyond that end of the said trunk so that they can engage the material to be conveyed before it actually enters the conveying trunk so that each conveying member gathers its load without other assistance, except the pull of the chain, and brings its load to the bottom or end of the column ready to be conveyed. For convenience sake I term this "self-feeding." The said material may be discharged after the chains leave the interior of the conveying trunk. This I refer to as "pressure discharge." Where a series of trunks are used one trunk may discharge into the following trunk and thus provide a form of feed which I term a "pressure feed," although "pressure feed" may be otherwise obtained.

Various embodiments of the invention are illustrated by way of example in the accompanying drawings, wherein:

Figure 1 is a view in vertical section of one embodiment of the invention, the section being taken substantially along line 1—1 of Fig. 4;

Fig. 2 is a rear elevation, with parts broken away, of the driving mechanism employed in connection with the structure of Fig. 1;

Fig. 3 is a view in side elevation of the structure shown in Fig. 2;

Fig. 4 is a sectional view taken substantially along the line 4—4 of Fig. 1;

Fig. 5 is a sectional view in elevation, at right angles to Fig. 1, of a portion of the device shown therein;

Fig. 6 is a diagrammatic view in vertical section of a modification of the discharge end of the device shown in Fig. 1;

Figs. 7 and 8 are detailed, end and side, sectional views of the feeding mechanism of the device shown in Fig. 1;

Fig. 9 is a diagrammatic showing, partially in section and partially in elevation, of a modification of the invention;

Fig. 10 is a horizontal section through the horizontal conveyor member shown in Fig. 9; and Fig. 11 is a vertical section of the same.

In the embodiment of the invention shown in Fig. 1, a conduit or trunk 1 of square or other rectangular shape in cross section has an inlet opening 2 at the bottom, and has front and back walls 3, which may be widened somewhat at their upper ends 4 as shown in Fig. 9, or a flexible tube 5 attached (see Fig. 9), forming a reservoir at the top of the trunk section 1. Two endless tension member 6 in the form of closely articulated roller or like chains extend along the side walls of the conduit 1 with the material-engaging portions of the said tension members positioned closely adjacent the inner surfaces of said walls and the other portions of said tension members positioned exteriorly of said walls, each chain having projections 8 extending laterally at intervals towards the front and back walls, so as to act as flight members. These flight members can conveniently be in the form of blocks of plastic or metal fitted over extended chain link pivot pins 9 and curved top and bottom to enter the drum slots 21. At the upper end of the trunk 1, the chains 6 pass outwards over sprockets 10 and, if desired, spring tension jockeys and thence downwards outside the trunk to corresponding sprockets 11 or other guides at the bottom 12 of the trunk. The top sprockets 10 are driven in opposite directions, say by a self-contained motor 10b and reduction spur and worm gearing 10c. The support of the motor 10b may be offset from the trunk. Both chains 6 run upwards within the trunk 1 at relatively high speed. A clear space 13 exists between the chains 6, and through this space the grain or equivalent is carried upwards in a solid column from the inlet opening 2, the grain or equivalent welling upwards within the reservoir at the top of the trunk section 1. Attached to the reservoir at the top of trunk section 1, as by the flexible connection 5 (Fig. 9) there may be one or more conveyor sections 14 adapted to still further transport the grain or other material. The grain-advancing means provided in each of these successive conveyor sections is preferably substantially identical with that shown and described in connection with the first section 1. As shown in Fig. 9, where two successive conveyor sections 14 are provided and where the connections between successive sections are flexible, the third conveyor section may conveniently be turned through an angle of 90 degrees with respect to the first section. It will be understood that any number of successive conveyor sections may be connected and that the connections may be flexible or rigid. If desired, the conveyor units 14 may be provided with sprocket guides 36, for example as shown in the middle conveyor section 14 of the three conveyor sections of Fig. 9. Where the connections are flexible they may, if desired, comprise a sliding ball and socket joint connection or any suitable flexible connecting means. As shown in Fig. 9, the flexible connections 5 are joined to their respective conveyor sections 14 by band clips 17. The chains have a relatively small thickness and can therefore be run at high speed over small sprockets, thus saving reduction gear and weight and at the same time producing a high rate of output, the carrying capacity being mainly dependent upon the clear space between the two chains.

The return runs of the chains along the outsides of the trunk sections are normally encased as at 19. Means are provided to prevent or reduce the escape of grain or equivalent around the sprockets. The said means may comprise sealing drums 20 recessed at 21 and employed in connection with the top sprockets 10, to receive the curved tails 22 of the flight members 8 as they are carried round the sprockets to get a positive drive and a partial friction drive when small tension jockeys are used. The heads of the members 8 are curved in contour and are struck to the same radius as the drums 20 so that the drum presents a substantially unorificed surface to the grain being lifted. The construction is such that flights clean themselves on the edges of the recesses 21 when entering and leaving the said recesses. Leaf springs (not shown) take up the slack of the chains 6. The sprockets 10 and sealing drums 20 pass through lateral orifices 24 in the trunks, of which the upper portions 25 serve as sweepers.

In the form illustrated in Fig. 6, a discharge chute 27 is provided to the trunk unit 28, and the chain 29 remote from the chute is longer than the chain 6 adjacent thereto, so that the chain 29 extends above chute 27. Chain 29 is driven by a sprocket 30 at a higher level than the chute 27.

The structure shown in Fig. 9 has already been described. It should be understood that each successive conveyor section may preferably be provided with its own motor drive, thus permitting the ready and rapid extension or shortening of the entire conveyor. The conveyor sections may be of the same length or of different lengths but are preferably of such size as to be readily handled and attached to one another by labor without the aid of mechanical devices.

The horizontal trunk or unit 37 (Figs. 9, 10 and 11) comprises a horizontal conveyor unit with an open bottom adapted to rest on bulk material and to feed the elevator 1 and is joined to the vertical elevator 1 by arms 40 pivoted to a ring 41 which lies in an annular channel member 43 secured to the trunk 1, and at 42 to the unit 37. The arrangement of chains and sprockets in unit 37 is substantially as described with reference to Fig. 1. Thus as the trunk 1 elevates the material the unit 37 fills up the hole created by such elevation. The unit 37 is provided with a motor drive as described with reference to Fig. 1.

To prevent the grain or equivalent from leaking outwards at the upper end of each trunk section, the two driving shafts may be fitted with cylindrical or drum members 20 as previously described (Figs. 7, 8), one on each side of the sprocket, said drums 20 conveniently being hollow. In diameter the drums are substantially equal to the outside diameter of the sprockets and they are formed with longitudinal grooves 21 of sufficient size to accommodate the flight members 8, the circumferential spacing of the grooves being exactly equal to the spacing of the flight members along the chains. Therefore, as each chain passes around the sprocket, the successive flight members are received by the grooves in the drum, thus producing a complete cylinder past which the grain or equivalent cannot leak in any substantial quantity. If desired, a scraper plate 45 may be provided, the edge of said plate being disposed closely adjacent the surface of the cylinder or drum sprocket or being pressed resiliently thereagainst to produce a seal.

The invention thus provides an extremely versatile form of conveyor or elevator device in which any number of sections can be coupled together depending upon the distance along which the grain or equivalent is to be carried.

It may be found desirable in some cases to feed the first double chain section from the conveyor or elevator of different construction, say one having a single tension member fitted with plate-like or skeleton flight members of the more orthodox type.

The invention is applicable to en masse conveyors and elevators having at least two endless tension members running side by side, or otherwise.

The reservoir may be omitted.

The trunk sections may be arranged to convey obliquely downwards.

What I claim and desire to secure by Letters Patent is:

1. An en masse conveyor comprising, in combination, a trunk-like conduit having a portion adapted to receive material to be transported and a discharge portion, a plurality of spaced, endless, chain-like members comprising laterally extending, spaced flight elements and adapted to engage and transport material within said conduit and between said portions, and driving means for advancing said members within said conduit under tension, each of said members being positioned to travel in close proximity to the inner surface of said conduit with its material-engaging portion within said conduit and the remainder of said member exteriorly of said conduit, the discharge portion being positioned, in the direction of material flow, beyond the point at which at least one of the chain-like members leaves the interior of the conduit.

2. A conveyor as called for in claim 1 wherein a second chain-like member continues within said conduit to a point positioned beyond said discharge portion.

3. A conveyor as called for in claim 1 comprising trap means positioned to cooperate with said last-mentioned chain-like member to block discharge of material from said conduit at the point of egress of said chain-like member therefrom.

4. A conveyor as called for in claim 1 wherein the chain-like members extend beyond the material-receiving portion of said conduit to engage material to be moved before it enters said conduit.

5. A conveyor as called for in claim 1 wherein the width of the flight members associated with at least one of said chain-like members is substantially equal to the width of the chain-like member.

6. A conveyor as called for in claim 1 wherein the lateral length of the flight members associated with at least one of said chain-like members exceeds the distance within the conduit between said plurality of chain-like members.

7. A conveyor as called for in claim 1 wherein the discharge portion of said conduit comprises a coupling member of greater internal cross-sectional area than said conduit and adapted to engage the material-receiving portion of a second, similar, trunk-like conduit.

8. A conveyor as called for in claim 7 wherein said coupling member is adapted to permit angular movement between said first and second conduits.

9. A conveyor as called for in claim 1 comprising a supplemental, open-bottomed, channel-shaped element pivotally connected to the material-receiving portion of said conduit and extending laterally therefrom and provided with means for advancing material toward said portion of the conduit.

10. An en masse conveyor comprising, in combination, a trunk-like conduit having material-receiving and discharge portions, a plurality of spaced, endless, chain-like members for transporting material within said conduit and between said portions, each said chain-like member comprising spaced, laterally extending flight members mounted on a continuous, flexible, power-transmitting element, driving means for advancing said chain-like members within said conduit, said chain-like members being positioned in close proximity to the inner surface of said conduit with the material-engaging portion of each within said conduit and the remainder exteriorly thereof, at least one of said chain-like members being positioned to leave said conduit before the discharge of material therefrom, and trap means comprising a roller recessed to receive the flight members and flexible element of said chain-like member and positioned at the place of egress of said member from said conduit to block discharge of material therefrom.

11. A conveyor as called for in claim 10 wherein said driving means comprises said roller.

12. A conveyor as called for in claim 10 wherein each said flight member is so shaped as to provide with said roller, when positioned within a recess therein, a substantially smooth, continuous surface.

13. A conveyor as called for in claim 1 wherein the discharge portion is positioned, in the direction of material flow, beyond the point at which each of the chain-like members leaves the interior of the conduit.

ARNOLD REDLER.

REFERENCES CITED

The following references are of record in the file of this patent:

UNITED STATES PATENTS

| Number | Name | Date |
| --- | --- | --- |
| 1,193,565 | Krunfus | Aug. 8, 1916 |
| 1,441,249 | Smith | Jan. 9, 1923 |
| 2,409,318 | Sivyer | Oct. 15, 1946 |